No. 847,540. PATENTED MAR. 19, 1907.
C. W. ATKINSON.
ELECTRIC METER.
APPLICATION FILED DEC. 29, 1904.
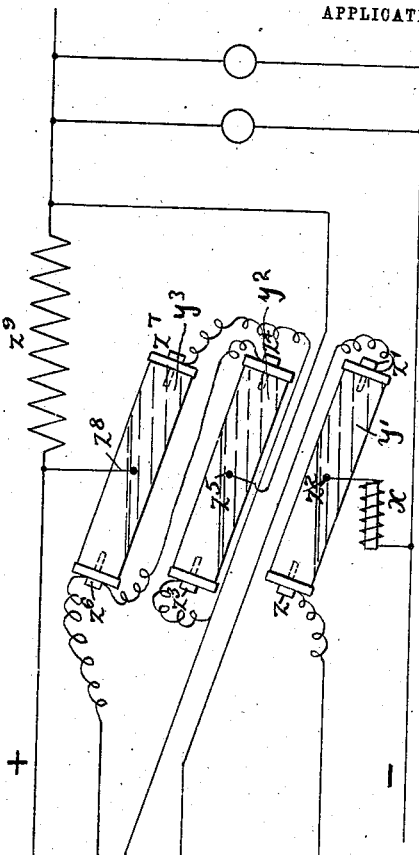
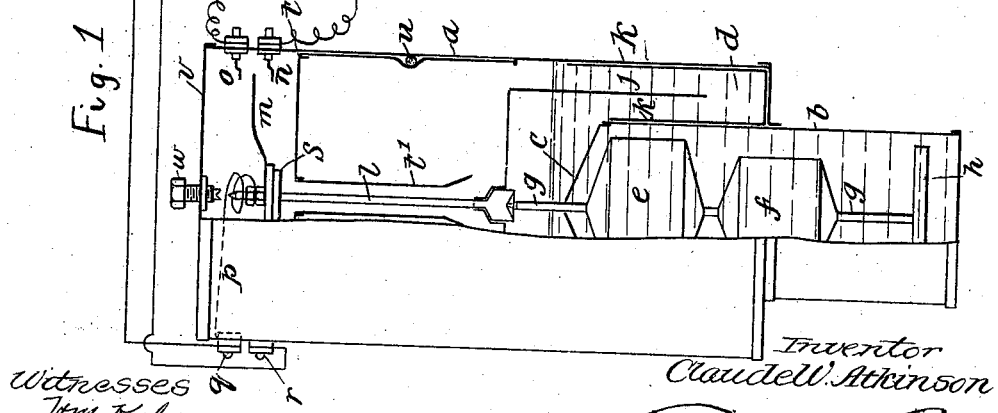

UNITED STATES PATENT OFFICE.

CLAUDE WILLIAM ATKINSON, OF BECKENHAM, ENGLAND.

ELECTRIC METER.

No. 847,540.  Specification of Letters Patent.  Patented March 19, 1907.

Application filed December 29, 1904. Serial No. 238,805.

*To all whom it may concern:*

Be it known that I, CLAUDE WILLIAM ATKINSON, a subject of the King of Great Britain and Ireland, residing at Beckenham, county of Kent, England, have invented new and useful Improvements in and Relating to Electric Meters, of which the following is a specification.

This invention relates to electric meters of the type in which the operation is effected by electrolytic action, and has for its object the provision of means whereby the recording function of the meter is continuous in its effect and errors due to friction and other causes are very small, with a consequent high efficiency as to recording capacity.

In order that the invention may be the better understood, I will now proceed to describe the same in relation to the accompanying drawings, reference being had to the letters and figures marked thereon.

Like letters refer to like parts in the various figures.

Figure 1 is a part sectional view of the electrolytic cell forming the measuring element of the device with the electrical circuits diagrammatically shown in relation to the switching mechanism. Fig. 2 is a detail view of the relay and the integrating and switching mechanism operated thereby.

To carry the invention into effect, I form an electrolytic cell $a$ with a well-receptacle $b$, closed with a cover $c$. This well-receptacle $b$ is smaller in diameter than the cell $a$ and is arranged so that an annular chamber $d$ is formed. Within the well-receptacle $b$, I provide a hydrometer-float made up of two bodies $e$ and $f$, lighter than the fluid in which they float, and a balance-weight $h$, heavier than the fluid, and I construct those two bodies of different materials. I make the body $e$ hollow, of copper or some material having a coefficient of expansion with temperature much smaller than that of the fluid, while I make the body $f$ of bees wax or some material having a coefficient of expansion much larger than that of the fluid. I so proportion the relative volumes of these two bodies that the total expansion of these bodies and the balance-weight $h$ is equal to the total expansion of the fluid which they displace. The float $e$ has a stem $g$, which passes up through the cover $c$. The lower end of the stem $g$ carries a balance-weight $h$, which can act as a foot to rest upon the bottom of the receptacle $b$ to prevent injury to the instrument during transit. Upon the upper end of the stem $g$, I support a movable electrode $j$, which is of circular formation and is submerged in that portion of the electrolyte contained in the annular chamber $d$.

The fixed electrode $k$ is arranged on the walls of the annular chamber $d$, so as to be in juxtaposition to the movable electrode $j$.

The level of the electrolyte is such as to be above the orifice in the cover $c$, through which the stem $g$ passes, so that although the electrolyte in the well-receptacle $b$ and the annular chamber $d$ are in communication with one another the circulation of the electrolyte from one to the other is prevented, and thus errors due to the variation of the density of the electrolyte from electrolytic action are avoided, as the float $e$ is supported constantly in the body of liquid the density of which is only varied by its temperature.

The movable electrode $j$ carries a stem $l$, having at its upper end a flexible contact-piece $m$, which at the upper and lower positions of the float $e$ makes contact, respectively, with the terminals $n$ $o$. The stem $l$ is also connected by the light flexible connecter $p$ to the terminal $q$, and the terminal $r$ is connected to the metal case and cell $a$ and is thus in connection with the fixed electrode $k$.

In order to prevent the damage of the moving elements during transit and the admission of the electrolyte into the upper portion of the cell where the electrical circuits are situated, I provide jointing-washer of cork or other material $s$ on the upper end of the stem, which is adapted to contact with an inner cover $t$, having a tubular central extension and a circumferential groove holding a turn of greased packing $u$. The cover $v$ of the cell $a$ hermetically closes the latter and is provided with a screw $w$, which can be screwed down so as to contact with the stem $l$ and force the float $e$ downward until the balance-weight $h$ rests on the bottom of the well-receptacle $b$, and at the same time the washer $s$ forms a joint on the cover $t$. Not only are the moving parts thus kept from damage by shock, but the cell can be inverted without any of the electrolyte getting into the chamber where the electrical contacts are situated.

In Fig. 2 I show an electromagnetic relay $x$, which through its armature $x'$ and detent-rod $x^2$ coacts with a ratchet-wheel $x^3$ in the train of wheels of the integrating mechanism. This wheel $x^3$ is geared to a disk $x^4$, carrying a pin $x^5$, which pin engages with a fork $y$, carried by the switch device, having three switches $y'$, $y^2$, and $y^3$ rotatable on a common axis $y^4$. The fork $y$ carries an arm $y^5$, coacting with a ridge-shaped spring $y^6$, so arranged that on the rotation of the wheel $x^4$ the pin $x^5$ in moving the fork past the central position, which is one of unstable equilibrium, the spring $y^6$ acting on the arm $y^5$ forces the fork to its other extreme position. The switches $y'$, $y^2$, and $y^3$ each consist of hermetically-sealed tubes partially filled with mercury and having contacts at each end and in the center $z$, $z'$, $z^2$, $z^3$, $z^4$, $z^5$, $z^6$, $z^7$, and $z^8$, respectively.

By reference to Fig. 1 it will be seen that the circuit from the contact $z^2$ of the switch $y'$ passes round the coil of the relay $x$ and is connected to the negative main. The contact $z'$ is connected to the upper contact $o$ of the cell-switch, and the contact $z$ is connected to the lower contact $n$ of the cell-switch. The contact $z^5$ of the switch $y^2$ is connected to the positive main as a part of a shunt-circuit. The contact $z^4$ is connected to the contact $z^6$ of the switch $y^3$, and the contact $z^3$ is connected to the contact $z^7$ of the same switch, forming cross connections. The contact $z^8$ of the switch $y^3$ is connected to the positive main at the other side of the esistance $z^9$, completing the shunt-circuit, while the contact $z^6$ is connected to the contact $q$ on the cell and the contact $r$ on the cell is connected to the contact $z^3$ of the switch $y^2$.

Assuming that the float $e$ is in the lower position, the operation of the meter is as follows: When a given amount of current has been passed through the cell, the weight of the electrode $j$ has decreased, causing the float to rise until the contact-arm $m$ touches the contact $o$, energizes the relay $x$, and operates the integrating mechanism $x^3$, which in turn causes the switches $y'$, $y^2$, and $y^3$ to rock on their axes, reversing the polarity of the cell and breaking the circuit of the relay, ready for the next operation. The current now passes through the cell in the opposite direction, causing the float to sink until the flexible arm $m$ touches the lower contact $n$, again energizing the relay operating the integrating mechanism to record a further quantity of current passed and rocking the switches into the reverse position.

Having now described my invention, I declare that what I claim, and desire to secure by Letters Patent, is—

1. An electrolytic meter comprising a cell containing the electrolyte and one stationary electrode, a float carrying the other electrode, two electrical contacts adapted to be closed by the float at its upper and lower positions, an electromagnetic relay adapted to be operated by a current controlled by the said contacts, and a reversing-switch adapted to reverse the polarity of the electrolytic cell in combination with an integrating mechanism operated by the electromagnetic relay, substantially as described.

2. An electrolytic meter comprising a cell containing the electrolyte and one stationary electrode, a float carrying the other electrode, two electrical contacts adapted to be closed by the float at its upper and lower positions an electromagnetic relay adapted to be operated by a current controlled by the said contacts, and a reversing-switch adapted to reverse the polarity of the electrolytic cell, and provided with mechanical means which are in a condition of unstable equilibrium at the center position, adapted to open the relay-circuit in use and make contact with the other relay-circuit ready for the next stroke of the float, in combination with an integrating mechanism operated by the electromagnetic relay, substantially as described.

3. An electrolytic meter comprising a cell containing the electrolyte and one stationary electrode, a float carrying the other electrode provided with means to compensate for the variation in the density of the electrolyte due to variation in temperature, two electrical contacts adapted to be closed by the float at its upper and lower positions, an electromagnetic relay adapted to be operated by a current controlled by the said contacts and a reversing-switch adapted to reverse the polarity of the electrolytic cell in combination with an integrating mechanism operated by the electromagnetic relay, substantially as described.

4. In an electrolytic meter, a cell containing the electrolyte provided with two independent chambers in communication with one another at the upper part, one chamber containing a stationary electrode and the other chamber containing a float adapted to carry the movable electrode within the chamber containing the stationary electrode in combination with means for reversing the polarity of the cell and with means for indicating the number of such changes in polarity, substantially as described.

In testimony whereof I have signed my name to this specification in the presence of two subscribing witnesses.

CLAUDE WILLIAM ATKINSON.

Witnesses:
RICHARD A. HOFFMANN,
CHARLES CARTER.